UNITED STATES PATENT OFFICE.

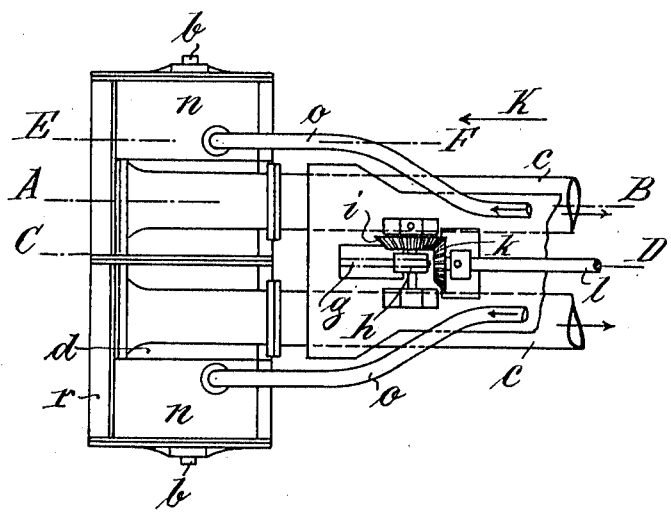

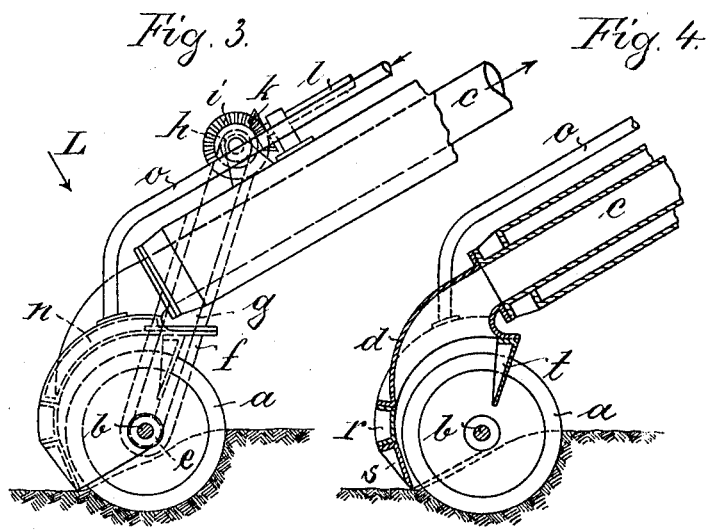
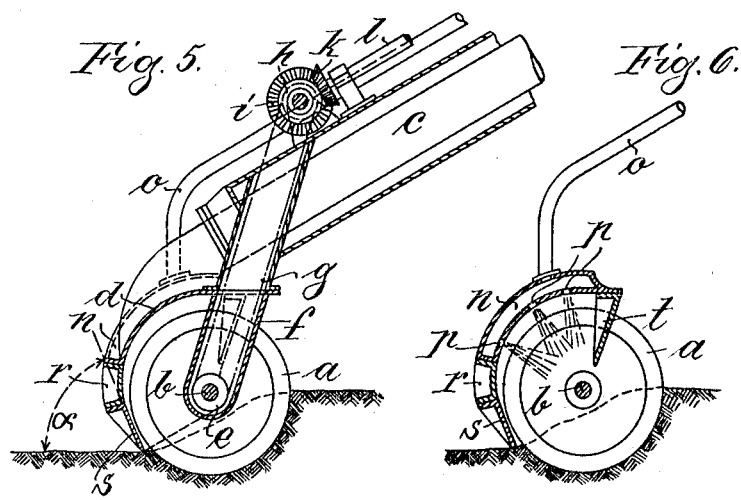

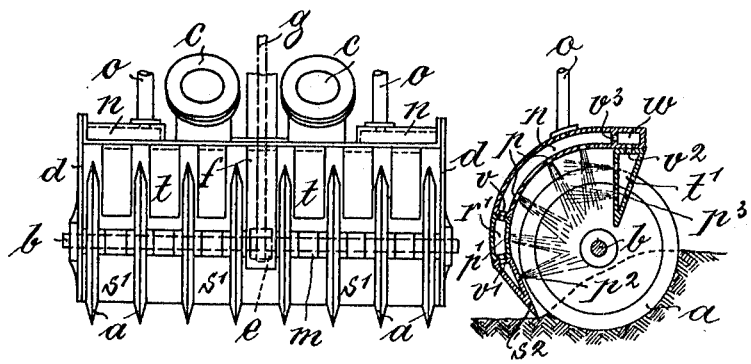
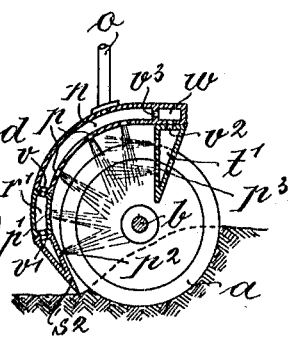
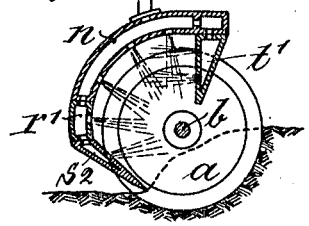
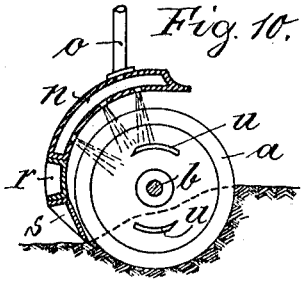
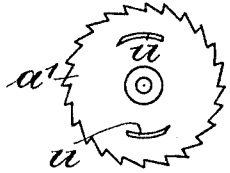
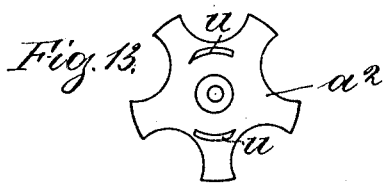

OTTO FRÜHLING, OF BRUNSWICK, GERMANY.

CUTTER FOR SUCTION-DREDGERS.

1,106,038.   Specification of Letters Patent.   Patented Aug. 4, 1914.

Application filed December 14, 1911. Serial No. 665,675.

*To all whom it may concern:*

Be it known that I, OTTO FRÜHLING, a subject of the Duke of Brunswick, and resident of 14 Löwenwall, city of Brunswick, German Empire, have invented a new and Improved Cutter for Suction-Dredgers, of which the following is a specification.

This invention relates to an improved cutter for dredgers of the suction type and is particularly intended for cutting heavy and tenaceous ground.

Hitherto rotary cutters or picks have usually been used to loosen and break up the ground and the broken material has then been drawn into the suction pipe with the water current. These devices however have the disadvantage that where large dredgers are used, very great power must be expended to loosen and break up the great quantities of material and for the reason that much more material must be broken up than can be drawn into the suction pipe. Furthermore the cutters or picks tend to prevent the forward movement of the dredger and cannot therefore be used for self-propelled dredgers.

The object of the present invention is to obviate the foregoing deficiencies and for this purpose I employ a series of rotatably driven cutters, such as circular disks, saws, notched disks or the like mounted on a shaft arranged across the mouth of the suction pipe which are adapted to cut up the material to be dredged into slices which however are not detached at their base from the remainder of the material but are afterward cut away at their base by a stationary knife or knives, which may also be arranged to break up the slices and feed them to the suction pipe.

In order that the invention may be more clearly understood, reference is made to the accompanying drawings, whereon I have shown, by way of example, various methods of carrying out my invention.

Figure 1 is a plan view of the cutter head of a suction dredger, constructed according to my invention, the view being taken in the direction of the arrow L of Fig. 3. Fig. 2 is a view looking in the direction of the arrow K of Fig. 1, but with the cutter head detached from the suction-pipes and showing a plurality of stationary knives. Fig. 3 is a side view of the cutter head illustrated in Figs. 1, 2 and 7. Fig. 4 is a vertical sectional view of the cutterhead on the line A—B of Fig. 1. Fig. 5 is a vertical sectional elevation of the cutter-head on the line C—D of Fig. 1. Fig. 6 is a vertical sectional elevation on the line E—F of Fig. 1. Fig. 7 is a view looking in the direction of the arrow K of Fig. 1 but with the cutter head detached from the suction pipes and showing a single stationary knife. Fig. 8 is a view corresponding to Fig. 6, showing a further modification, in which the stationary knife or knives and wipers are constructed as water-chambers. Fig. 9 is a view similar to Fig. 8 showing a still further modification, in which the knife-edge or edges of the stationary knife or knives enter the spaces between the rotatable cutters. Fig. 10 is a view corresponding to Fig. 6, but embodying the provision of intermediate transverse knives and dispensing with the wipers. Figs. 11, 12 and 13 illustrate various other forms of rotary cutters by way of example.

The cutter-head comprises essentially a plurality of rotatably driven cutters such as circular disks $a$ (Figs. 1 to 10) circular saws $a'$ (Figs. 11 and 12), notched disks $a^2$ (Fig. 13), or their equivalent, said cutters being mounted upon a shaft $b$ arranged across the mouth of the suction pipes $c$ and mounted at each end in suitable bearings in the curved cutter-hood $d$. Mounted centrally upon the shaft $b$ is a chain wheel $e$ inclosed within a recessed part $f$ of the cutter hood $d$ (Fig. 5), this chain wheel $e$ being driven by means of a chain $g$ from a chain wheel $h$ mounted on the same shaft as a bevel gear wheel $i$, which is driven by means of a bevel gear wheel $k$ gearing therewith and mounted upon a rotatable driving shaft $l$. It will of course be understood that the shaft $b$ may be driven by any other suitable gearing.

The thickness of the slices cut is determined by the length of the distance pieces $m$ between the rotary cutters $a$ and it will of course be understood that this distance and consequently the thickness of the slices may readily be varied by interchanging the distance pieces $m$. The depth of the cut may be varied by the employment of rotary cutters of different diameters or by raising or lowering the cutter head in the usual manner.

The forward movement of the rotary cutters $a$ is effected by the forward movement of the cutter head, irrespective of how the head is fitted on the dredger or how the dredger is moved forwardly, whether self-propelled or by means of anchors and chains.

Mounted upon the hood $d$ of the cutter head is a plurality of water chambers $n$ adapted to be supplied with water under pressure from water supply pipes $o$, the inner curved walls of these chambers being provided with orifices $p$, from which the water may issue in more or less radial jets, so as to facilitate the treatment of the material to be dredged after it is severed from its base and as it passes through the dredge head before entering the suction pipe.

Extending across the rear of the cutter head and suspended from the curved hood $d$ is a transverse connecting piece $r$, from which are suspended a plurality of stationary knives $s$ arranged behind the rotary cutters $a$ and which are of such a form that, on the forward movement of the cutter head, the slices cut by the rotary cutters, are cut away at their base at the desired height, the stationary knives $s$ at the same time turning up the slices and feeding them to the mouth of the suction pipes $c$. As shown in Fig. 2 the stationary knives $s$ are preferably arranged intermediate the rotary cutters $a$ but, if desired, the stationary knives $s$ may be united to form a single knife $s'$ extending across the whole width of the cutter head, as shown in Fig. 7. The cutting angle of the stationary knives $s$ (see Fig. 5) is capable of adjustment by employing intermediate connecting pieces $r$ of varying sizes. Thus the cutting angle may be adjusted for different materials to be attacked or for dredging at different depths. Depending from the front of the cutter hood $d$ are a series of wipers $t$, arranged intermediate the rotary cutters $a$ and adapted to remove any material clinging to the rotary cutters $a$ and clean the same ready for the next cut, while at the same time the wipers $t$ serve to retain the cut material within the cutter hood $d$ and facilitate its removal by way of the suction pipes $c$.

It will of course be understood that the device hereinbefore illustrated may also be used for dredging purposes, where the material to be dredged is of a softer nature, in which case the wipers $t$ may be dispensed with as illustrated in Fig. 10, and if desired, the cutters $a$, $a'$, $a^2$ may be provided with intermediate transverse knives $u$ for cutting up the slices of material to be dredged.

Fig. 8 illustrates a further modification, in which the connecting piece, stationary knife or knives and wipers are constructed in the form of water chambers $r'$, $s^2$ and $t'$ respectively, having orifices $p'$, $p^2$ and $p^3$ respectively in their inner walls, the water from the main water chambers $n$ being supplied to the connecting piece $r'$ through apertures $v$ and from thence to the knife or knives $s^2$ through apertures $v'$, while water is supplied to the wipers $t'$ through apertures $v^2$ from a transverse connecting chamber $w$ supplied with water from the main chambers $m$ through orifices $v^3$.

As illustrated in Fig. 9, the stationary knives $s^2$ may, if desired, be arranged so as to fit between the rotary cutters $a$.

It will of course be readily understood, that various alterations may be made in the examples of my invention described and illustrated herein, and details be dispensed with, without departing from the scope of the appended claims.

I desire it to be understood that the term "cutting device" in the appended claims is to be construed as including either a single stationary knife or a plurality of stationary knives adapted to cut away the sliced ground.

I claim:

1. In combination with the suction pipe of a suction dredger, a plurality of cutters arranged on a horizontal axis across the mouth of said suction pipe, means to rotate the cutters in a vertical plane so as to cut the material to be dredged into slices attached at their bases to the remainder of the material, and a stationary cutting device arranged in the rear of said cutters so as to cut away said slices at their bases.

2. In combination with the suction pipe of a suction dredger, a plurality of cutters arranged on a horizontal axis across the mouth of said suction pipe, means to rotate the cutters in a vertical plane so as to cut the material to be dredged into slices, a curved hood over said cutters, and wipers intermediate said cutters and depending substantially vertically from the front of said hood almost to the axis of said cutters.

3. In combination with the suction pipe of a suction dredger, a plurality of cutters arranged on a horizontal axis across the mouth of said suction pipe, means to rotate the cutters in a vertical plane so as to cut the material to be dredged into slices attached at their bases to the remainder of the material, a stationary cutting device arranged in the rear of said cutters so as to cut away said slices at their bases, a curved hood over said cutters, and wipers intermediate said cutters and depending substantially vertically from the front of said hood almost to the axis of said cutters.

4. In combination with the suction pipe of a suction dredger, a plurality of rotatably driven cutters arranged at the mouth of said suction pipe, a curved hood over said cutters, a stationary cutting device in the rear of said cutters, and an interchangeable connecting piece between said cutting device and hood to adjust the angle of incidence of the cutting device.

5. In combination with the suction pipe of a suction dredger, a plurality of rotatably driven cutters arranged at the mouth of said suction pipe, a curved hood over said cutters, a stationary cutting device in the rear of said cutters, an interchangeable connecting piece between said cutting device and hood to adjust the angle of incidence of the cutting device and wipers intermediate said cutters and depending substantially vertically from the front of said hood almost to the axis of said cutters.

6. In combination with the suction pipe of a suction dredger, a plurality of rotatably driven cutters arranged at the mouth of said suction pipe so as to cut the material to be dredged into slices attached at their bases to the remainder of the material, a stationary hollow cutting device arranged in the rear of said cutters so as to cut away said slices at their bases, a hollow curved hood over said cutters, said hollow cutting device and hood having orifices in their inner walls, and means for supplying water to said hollow cutting device and hood.

7. In combination with the suction pipe of a suction dredger, a plurality of rotatably driven cutters arranged at the mouth of said suction pipe so as to cut the material to be dredged into slices, a hollow curved hood over said cutters, hollow wipers intermediate said cutters, said hollow hood and wipers having orifices in their inner walls, and means for supplying water to said hollow hood and wipers.

8. In combination with the suction pipe of a suction dredger, a plurality of rotatably driven cutters arranged at the mouth of said suction pipe so as to cut the material to be dredged into slices attached at their bases to the remainder of the material, a stationary hollow cutting device arranged in the rear of said cutters so as to cut away said slices at their bases, a hollow curved hood over said cutters, hollow wipers intermediate said cutters, said hollow cutting device, hood and wipers having orifices in their inner walls, and means for supplying water to said hollow cutting device, hood and wipers.

9. In combination with the suction pipe of a suction dredger, a plurality of rotatably driven cutters arranged at the mouth of said suction pipe, a hollow curved hood over said cutters, a stationary hollow cutting device in the rear of said cutters, an interchangeable hollow connecting piece between said hollow cutting device and hollow hood to adjust the angle of incidence of the cutting device, said hollow hood, cutting device and connecting piece having orifices in their inner walls, and means for supplying water to said hollow hood, cutting device and connecting piece.

10. In combination with the suction pipe of a suction dredger, a plurality of rotatably driven cutters arranged at the mouth of said suction pipe, a hollow curved hood over said cutters, a stationary hollow cutting device in the rear of said cutters, an interchangeable hollow connecting piece between said hollow cutting device and hollow hood, hollow wipers intermediate said cutters, said hollow hood, cutting device, connecting piece and wipers having orifices in their inner walls, and means for supplying water to said hollow hood, cutting device, connecting piece and wipers.

11. In combination with the suction pipe of a suction dredger, a cutter head for the dredger, a plurality of cutters arranged on a horizontal axis across the mouth of said cutter head, means to rotate the cutters in a vertical plane so as to make vertical cuts to cut the material into slices attached at their bases to the remainder of the material, and a stationary cutting device arranged in the rear of said cutter head so as to make horizontal cuts to cut away the slices at their bases.

12. In combination with the suction pipe of a suction dredger, means arranged at the head of the suction pipe for causing a series of vertical cuts in the material to be dredged, means for causing a horizontal cut coöperating with the vertical cuts to separate the material from its base, and means for adjusting the angle of incidence of the last named cutting means.

In witness whereof I have hereunto set my hand in the presence of two witnesses.

OTTO FRÜHLING.

Witnesses:
FRIEDA BARTELS,
EMMA FIEHE.

Copies of this patent may be obtained for five cents each, by addressing the "Commissioner of Patents, Washington, D. C."